(12) United States Patent
Yang et al.

(10) Patent No.: US 7,948,588 B2
(45) Date of Patent: May 24, 2011

(54) THIN FILM TRANSISTOR ARRAY PANEL COMPRISING FIRST AND SECOND REFLECTIVE ELECTRODES

(75) Inventors: Young-Chol Yang, Seongnam-si (KR); Jae-Hyuk Chang, Seoul (KR); Jeong-Ye Choi, Hwaseong-si (KR)

(73) Assignee: Samsung Electronics Co., Ltd. (KR)

( * ) Notice: Subject to any disclaimer, the term of this patent is extended or adjusted under 35 U.S.C. 154(b) by 415 days.

(21) Appl. No.: 11/543,317

(22) Filed: Oct. 3, 2006

(65) Prior Publication Data
US 2007/0076148 A1 Apr. 5, 2007

(30) Foreign Application Priority Data
Oct. 5, 2005 (KR) .................. 10-2005-0093440

(51) Int. Cl.
*G02F 1/1335* (2006.01)
*G02F 1/135* (2006.01)
(52) U.S. Cl. ........................................ 349/114; 349/39
(58) Field of Classification Search .................. 349/39, 349/113–114
See application file for complete search history.

(56) References Cited

U.S. PATENT DOCUMENTS

| | | | |
|---|---|---|---|
| 5,576,858 A | 11/1996 | Ukai et al. | |
| 6,829,024 B2 | 12/2004 | Park et al. | |
| 6,927,820 B2 * | 8/2005 | Jang et al. | 349/114 |
| 2004/0124414 A1 * | 7/2004 | Jang et al. | 257/59 |
| 2006/0132682 A1 * | 6/2006 | Yang et al. | 349/114 |
| 2007/0064182 A1 * | 3/2007 | Lin et al. | 349/114 |

FOREIGN PATENT DOCUMENTS

| | | |
|---|---|---|
| JP | 2004-163461 A | 6/2004 |
| KR | 1020060069080 A | 6/2006 |
| WO | 2004057411 A2 | 7/2004 |

* cited by examiner

*Primary Examiner* — Mark A Robinson
*Assistant Examiner* — Charles Chang
(74) *Attorney, Agent, or Firm* — Innovation Counsel LLP

(57) ABSTRACT

A thin film transistor (TFT) array panel that automatically matches the gamma curves of the reflective mode and the transmissive mode is presented. The TFT array panel includes a substrate, a switching element formed on the substrate and including an input terminal, an output terminal, and a control terminal. A transmissive electrode is connected to the output terminal, and a first reflective electrode is connected to the output terminal. A storage electrode is formed on a layer that underlies the output terminal and separated from the output terminal to form a storage capacitor with the output terminal. A second reflective electrode is formed on a layer that is above the output terminal and separated from the output terminal to form an auxiliary capacitor with the output terminal.

4 Claims, 10 Drawing Sheets

THIN FILM TRANSISTOR ARRAY PANEL COMPRISING FIRST AND SECOND REFLECTIVE ELECTRODES

CROSS-REFERENCE TO RELATED APPLICATION

The present application claims priority from Korean Patent Application No. 10-2005-0093440 filed on Oct. 5, 2005, the disclosure of which is hereby incorporated herein by reference in its entirety.

BACKGROUND OF THE INVENTION (a) Field of the Invention

The present invention relates to a thin film transistor (TFT) array panel, and particularly to a transflective TFT.

(b) Description of the Related Art

LCDs are one of the most widely used flat panel displays today. Typically, an LCD includes a liquid crystal (LC) layer interposed between two panels provided with field-generating electrodes. The LCD displays images by applying voltages to the field-generating electrodes to generate an electric field in the LC layer. The electric field determines the orientations of LC molecules in the LC layer, and can be controlled to adjust the polarization of incident light. The polarized light coming out of the LC layer is either blocked or transmitted by a polarizing film. Thus, by controlling the polarization of light, desired images can be displayed.

Depending on the light source that is used, LCDs are classified into a transmissive LCD and a reflective LCD. The light source of the transmissive LCD is a backlight, and the light source of the reflective LCD is ambient light. The reflective-type LCD is usually applied to a small or mid-size display device.

A transflective LCD, which is a combination of the transmissive LCD and a reflective LCD, has been under development and is used in small or mid-size display devices. The transflective LCD is capable of using both a backlight and ambient light as its light source depending on circumstances, and they are usually applied to small or mid-size display devices. The transflective LCD has a transmissive region and a reflective region in a pixel. While light passes through an LC layer only once in the transmissive region, light passes through the LC layer twice in the reflective region. Accordingly, gamma curves of the transmissive region and the reflective region do not match, and images are displayed in different ways between the transmissive region and the reflective region.

To solve the problem, the LC layer may be formed to have different thicknesses (cell gaps) between the transmissive region and the reflective region. However, when the two-cell-gap structure is applied, a thicker layer is formed in the reflective region than in the transmissive region, thereby complicating the manufacturing process. Furthermore, this thickness difference results in the formation of a step between the transmissive region and the reflective region, and the LC molecules are aligned in a disorderly manner around the step. This lack of order in the area around the step degrades image quality. Also, in the area around the step, brightness reversion may occur when the voltage gets high.

As an alternative to the two-cell-gap structure, the transflective LCD may be driven by two different driving voltages depending on whether the LCD is in a transmissive mode or a reflective mode. When two different driving voltages are applied, gamma curves cannot match because there are different critical voltages for transmissive brightness and reflective brightness.

It is desirable to optimize the transflective LCD without the disadvantages mentioned above.

SUMMARY OF THE INVENTION

In one aspect, the present invention is a thin film transistor (TFT) array panel that includes a substrate, a switching element formed on the substrate and including an input terminal, an output terminal, and a control terminal, and a transmissive electrode connected to the output terminal. A first reflective electrode is connected to the output terminal, a storage electrode formed on a first layer disposed on a first side of the output terminal and separated from the output terminal to form a storage capacitor with the output terminal. A second reflective electrode is formed on a second layer disposed on a second side of the output terminal and separated from the output terminal, to form an auxiliary capacitor along with the output terminal.

In another aspect, the present invention is a thin film transistor (TFT) array panel that includes a substrate, a gate line formed on the substrate and having a gate electrode, a storage electrode line formed on the substrate and having a storage electrode, and a gate insulating layer formed on the storage electrode line and the gate line. A semiconductor is formed on the gate insulating layer and overlaps the gate electrode. A data line is formed on the gate insulating layer, connected to a source electrode extending over the semiconductor, and extending substantially perpendicularly to the gate line. A drain electrode formed on the semiconductor, the drain electrode being positioned across the semiconductor from the source electrode and overlapping the storage electrode. A first insulating layer is formed on the data line and the drain electrode and has a first contact hole extending through the first insulating layer to the drain electrode. A transmissive electrode is formed on the first insulating layer and connected to the drain electrode via the first contact hole. A first reflective electrode is connected to the transmissive electrode and defines a first reflective region. A second reflective electrode, which is separated from the transmissive electrode and the first reflective electrode, is capacitively coupled to the drain electrode and defines a second reflection region. The storage electrode and the drain electrode are located in the first reflective region and the second reflective region, respectively.

In yet another aspect, the present invention is, a thin film transistor array panel that includes a substrate, a gate line formed on the substrate and having a gate electrode, a storage electrode line formed on the substrate and having a storage electrode, a gate insulating layer formed on the storage electrode line and the gate line, and a semiconductor formed on the gate insulating layer and overlapping the gate electrode. A data line is formed on the gate insulating layer, connected to a source electrode extending over the semiconductor and extends substantially perpendicularly to the gate line. A drain electrode is formed on the semiconductor, positioned across the semiconductor from the source electrode and overlaps the storage electrode. A first insulating layer is formed on the data line and the drain electrode and has a first contact hole that extends through the first insulating layer to the drain electrode. A transmissive electrode is formed on the first insulating layer. A first reflective electrode is connected to the transmissive electrode and connected to the drain electrode via the first contact hole, the first reflective electrode defining a first reflective region. A second reflective electrode is separated from the transmissive electrode and the first reflective electrode and capacitively-coupled to the drain electrode, wherein the second reflective electrode defines the second reflected region. The storage electrode and the drain electrode are located in the first reflective region and the second reflective electrode region, respectively.

BRIEF DESCRIPTION OF THE DRAWINGS

The present invention will become more apparent by describing embodiments thereof in detail with reference to the accompanying drawings, in which.

DETAILED DESCRIPTION OF THE EMBODIMENTS

Figure 1:
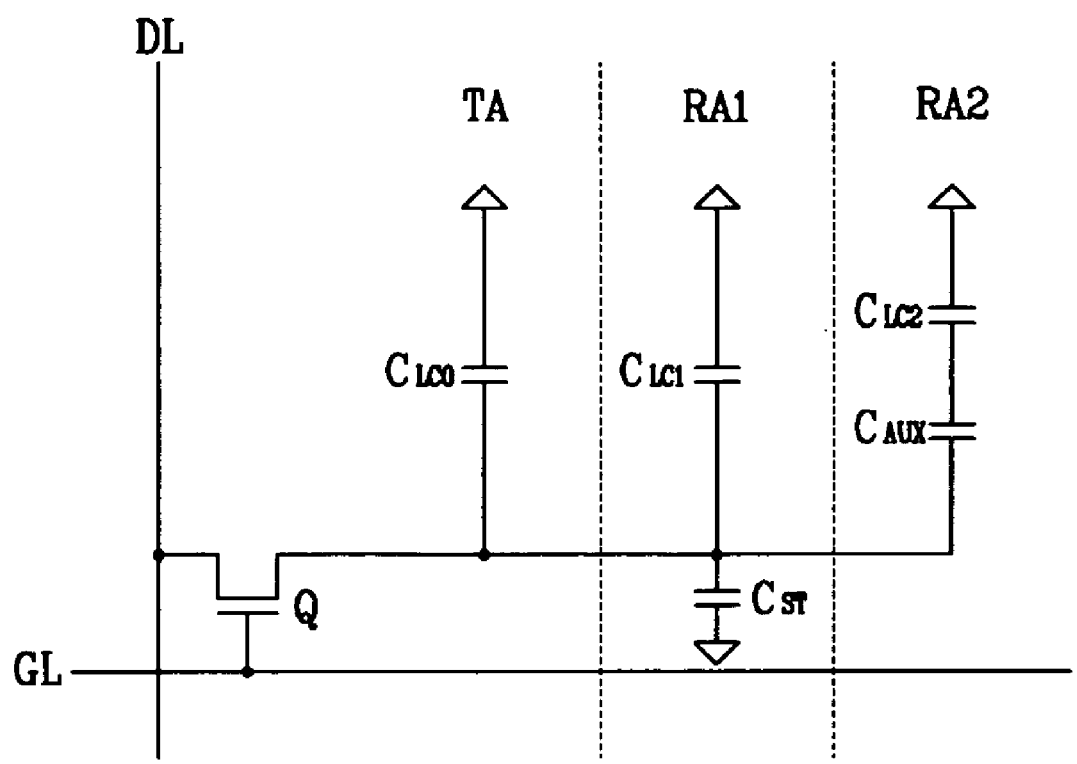
FIG. 1 is an equivalent circuit diagram of an LCD according to an embodiment of the present invention.

Preferred embodiments of the present invention will now be described more fully hereinafter with reference to the accompanying drawings, in which preferred embodiments of the invention are shown. The present invention may, however, be embodied in different forms and should not be construed as being limited to the embodiments set forth herein. Rather, these embodiments are provided so that this disclosure will be thorough and complete, and will fully convey the scope of the invention to those skilled in the art.

In the drawings, the thickness of layers, films, and regions are exaggerated for clarity. Like numerals refer to like elements throughout. It will be understood that when an element such as a layer, film, region, or substrate is referred to as being "on" another element, it can be directly on the other element or intervening elements may also be present.

Figure 2:
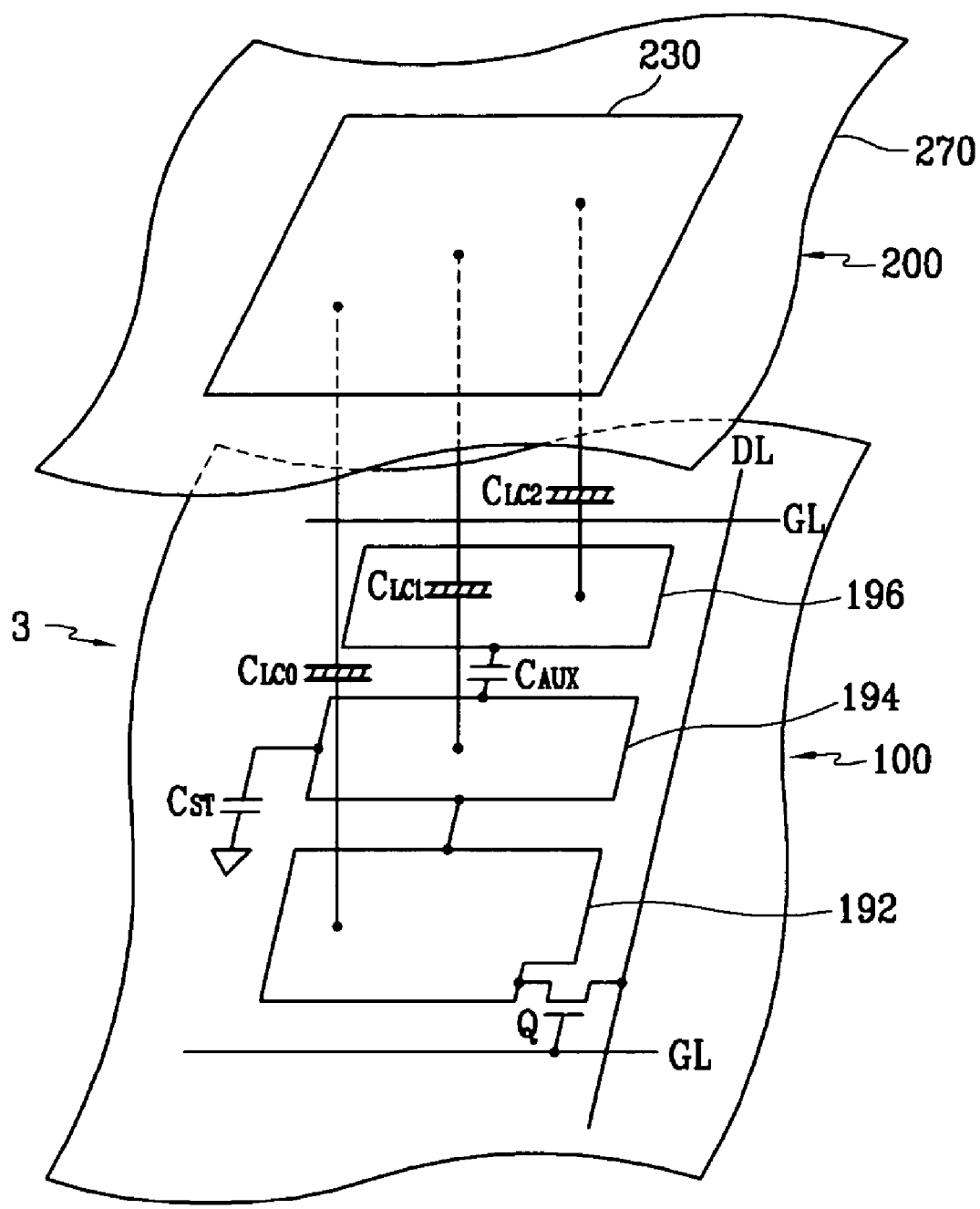
FIG. 2 is an equivalent circuit diagram of a pixel of an LCD according to an embodiment of the present invention.

FIG. 1 is an equivalent circuit diagram of an LCD according to an embodiment of the present invention, and FIG. 2 is an equivalent circuit diagram of a pixel of an LCD according to an embodiment of the present invention.

An LCD according to an embodiment of the present invention includes a plurality of display signal lines GL and DL that form a plurality of pixels that are arranged substantially in a matrix format. In addition, the LCD includes a TFT array panel 100 (which is also referred to as a lower panel), a common electrode panel 200 (which is also referred to as an upper panel) that is positioned substantially parallel to the TFT array panel 100, and a liquid crystal layer 3 interposed between the two panels 100 and 200.

The display signal lines GL and DL are provided on the TFT array panel 100 and include a plurality of gate lines GL for transmitting gate signals (also referred to as "scanning signals"), and a plurality of data lines DL for transmitting data signals. The gate lines GL extend substantially in a first direction and substantially parallel to each other, while the data lines DL extend substantially in a second direction and substantially parallel to each other.

Each pixel includes, a switching element Q connected to the gate lines GL and the data lines DL, a transmissive LC capacitor $C_{LC0}$, a first reflective LC capacitor $C_{LC1}$, an auxiliary capacitor $C_{AUX}$, a storage capacitor $C_{ST}$, and a second reflective LC capacitor $C_{LC2}$ connected to the auxiliary capacitor $C_{AUX}$. The storage capacitor $C_{ST}$ may be omitted in some embodiments.

The switching element Q, such as a TFT, is provided on the TFT array panel 100 and has three terminals: a control terminal connected to one of the gate lines GL; an input terminal connected to one of the data lines DL; and an output terminal connected to the transmissive LC capacitor $C_{LC0}$, the first reflective LC capacitor $C_{LC1}$, the auxiliary capacitor $C_{AUX}$, and the storage capacitor $C_{ST}$.

Referring to FIG. 2, the transmissive LC capacitor $C_{LC0}$ includes a transmissive electrode 192 provided on the TFT array panel 100 and a common electrode 270 provided on the common electrode panel 200, as two terminals. The LC layer 3 is disposed between the two electrodes 192 and 270 and functions as a dielectric of the transmissive LC capacitor $C_{LC0}$. The transmissive electrode 192 is connected to the switching element Q, and the common electrode 270 is supplied with a common voltage Vcom and covers an entire surface of the common electrode panel 200. In some embodiments, the common electrode 270 may be provided on the TFT array panel 100, and both electrodes 192 and 270 may be shaped as bars or stripes.

The first reflective LC capacitor $C_{LC1}$ includes a first reflective electrode 194 provided on the TFT array panel 100 and the common electrode 270 as two terminals. The LC layer 3 disposed between the two electrodes 194 and 270 functions as the dielectric of the first reflective LC capacitor $C_{LC1}$. The first reflective electrode 194 is connected to the switching element Q via the transmissive electrode 192.

The second reflective LC capacitor $C_{LC2}$ includes a second reflective electrode 196 provided on the TFT array panel 100 and the common electrode 270 as two terminals. The LC layer 3 disposed between the two electrodes 196 and 270 functions as the dielectric of the second reflective LC capacitor $C_{LC2}$. The second reflective electrode 196 is connected to the auxiliary capacitor $C_{AUX}$.

The auxiliary capacitor $C_{AUX}$ includes the second reflective electrode 196 or a conductor (not shown) connected to the second reflective electrode 196, and one of the transmissive electrode 192, the first reflective electrode 194, and a conductor (not shown) connected thereto, which overlaps the second reflective electrode 196 or the conductor connected to the second reflective electrode 196 via an insulator. The auxiliary capacitor $C_{AUX}$ divides the voltage from the switching element Q with the second reflective LC capacitor $C_{LC2}$. Therefore, the voltage across the second reflective LC capacitor $C_{LC2}$ is smaller than that across the transmissive LC capacitor $C_{LC0}$ and the first reflective LC capacitor $C_{LC1}$.

A transflective LCD according to an embodiment of the present invention includes a plurality of transmissive regions TA and a plurality of first and second reflective regions RA1 and RA2.

In the transmissive regions TA defined by the transmissive electrode 192, light from a backlight unit (not shown) disposed under the TFT array panel 100 passes through the LC layer 3 to display desired images. In the first and second reflective regions RA1 and RA2 defined by the first and second reflective electrodes 194 and 196, ambient light such as sunlight is incident on the common electrode panel 200 and passes through it and the LC layer 3 to reach the first and second reflective electrodes 194 and 196. The ambient light is reflected by the first and second reflective electrodes 194 and 196 and passes through the LC layer 3 again.

The storage capacitor $C_{ST}$ is an auxiliary capacitor for the LC capacitors $C_{LC0}$, $C_{LC1}$ and $C_{LC2}$. The storage capacitor $C_{ST}$ includes the transmissive electrode 192 or the first reflective electrode 194. A storage electrode (not shown), which is provided on the TFT array panel 100, overlaps the transmissive electrode 192 or the first reflective electrode 194 such that the overlapping parts sandwich an insulator, and is supplied with a predetermined voltage such as a common voltage Vcom. In some embodiments, the storage capacitor $C_{ST}$ includes the transmissive electrode 192 or the first reflective electrode 194 and an adjacent gate line called a "previous gate line." The previous gate line overlaps the transmissive electrode 192 or the first reflective electrode 194 such that the overlapping parts sandwich an insulator.

Next, the layered structures of an LCD according to an embodiment of the present invention will be described with reference to FIG. 3.

Figure 3:
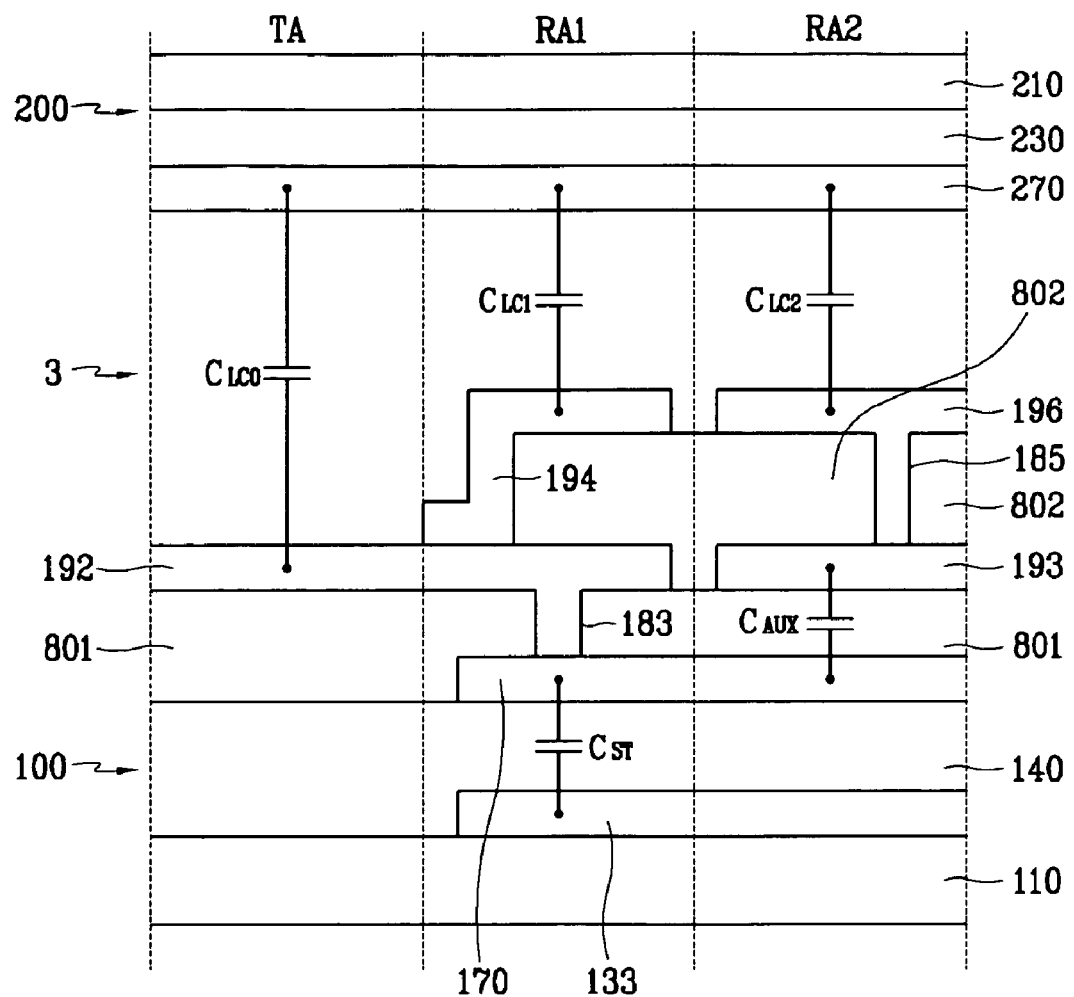
FIG. 3 is an example of a sectional view of the LCD shown in FIG. 2.

FIG. 3 is an example of a sectional view of the LCD shown in FIG. 2.

Referring to FIG. 3, a TFT array panel 100 has a storage electrode 133 formed on an insulating substrate 110, a gate insulating layer 140 covering the storage electrode 133, and an output electrode 170 of a switching element Q ("Q" is shown in FIG. 2) formed on the gate insulating layer 140. A storage capacitor $C_{ST}$ is formed between the storage electrode 133 and the output electrode 170, which overlaps the storage electrode 133.

A first insulating layer 801 is formed on the output electrode 170 and has a contact hole 183. A transmissive electrode 192 and an auxiliary electrode 193 are formed on the first insulating layer 801. The transmissive electrode 192 is physically and electrically connected to the output electrode 170 through the contact hole 183 and is separated from the auxiliary electrode 193. A second insulating layer 802 is formed on the transmissive electrode 192 and the auxiliary electrode 193 and is disposed on first and second reflective regions RA1 and RA2. The second insulating layer 802 may have an embossed surface. First and second reflective electrodes 194 and 196 are formed on the second insulating layer 802. The first reflective electrode 194 is connected to the transmissive electrode 192 and is separated from the second reflective electrode 196. The second reflective electrode 196 is connected to the auxiliary electrode 193 through a contact hole 185 formed on the second insulating layer 802.

The auxiliary capacitor $C_{AUX}$ is formed between the output electrode 170 and the auxiliary electrode 193, which overlaps the output electrode 170 interposing the first insulating layer 801. The output electrode 170 forms the storage electrode $C_{ST}$ along with the storage electrode 133 and also forms the auxiliary capacitor $C_{AUX}$ by overlapping the auxiliary electrode 193. At this time, since the storage electrode 133 is formed on the underlying layer of the output electrode 170 and the auxiliary electrode 193 is formed over the output electrode 170, the storage electrode 133 may be widely formed for overlapping the total output electrode 170, regardless of the arrangement of the auxiliary electrode 193. Moreover, although the output electrode 170 may be widely formed in the first and second reflective regions RA1 and RA2, the output electrode 170 does not influence the aperture ratio of the transmissive region TA. Therefore, a kickback voltage decreases by sufficiently increasing the capacitance of the storage capacitor $C_{ST}$. The high kickback voltage prevents image deterioration such as flicker phenomenon that is caused by the kickback voltage.

A common electrode panel 200 includes a color filter 230 formed on an insulating substrate 210 and a common electrode 270 formed on the color filter 230. An LC layer 3 is interposed between the TFT array panel 100 and the common electrode panel 200.

A transmissive LC capacitor $C_{LC0}$ includes the common electrode 270 and the transmissive electrode 192 as two terminals, and the LC layer 3 functions as the insulator of the transmissive LC capacitor $C_{LC0}$. First and second reflective LC capacitors $C_{LC1}$ and $C_{LC2}$ include the first and second reflective electrodes 194 and 196 and the common electrode 270, and at this time the LC layer 3 functions as an insulator of the first and second reflective LC capacitors $C_{LC1}$ and $C_{LC2}$ as well.

Methods of making a voltage-reflection curve match a voltage-transmittance curve in an LCD according to an embodiment of the present invention will be described with reference to FIG. 4.

Figure 4:
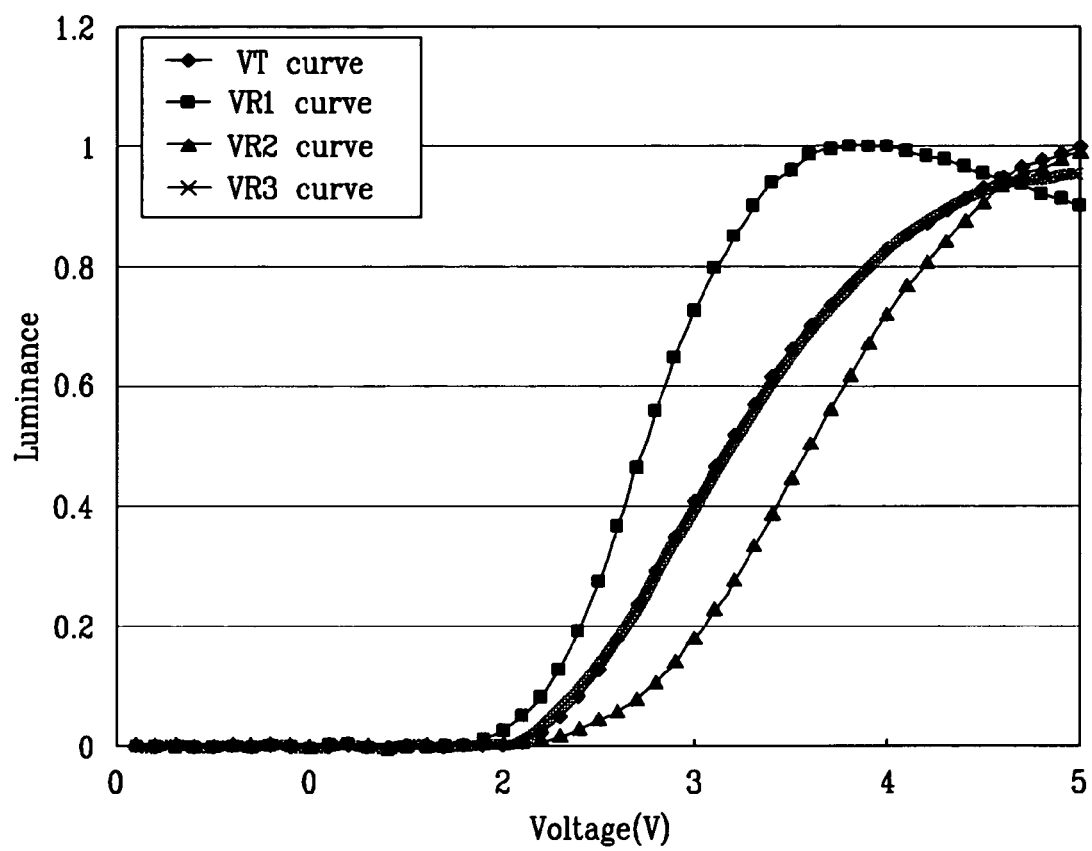
FIG. 4 shows a graph illustrating a voltage-transmittance curve and voltage-reflection curves of an LCD according to an embodiment of the present invention.

FIG. 4 shows a graph illustrating a voltage-transmittance curve and voltage-reflection curves with respect to the first and second reflective electrodes of the LCD shown in FIG. 2.

When a data voltage corresponding to an image signal is applied to the transmissive electrode 192 and the first reflective electrode 194 through the switching element Q, a voltage difference V (e.g. a pixel voltage) between the data voltage and the common voltage Vcom forms between the two terminals of the transmissive LC capacitor $C_{LC0}$ and the first reflective LC capacitor $C_{LC1}$. However, a voltage difference V2 that is smaller than the pixel voltage V is formed between the two terminals of the second reflective LC capacitor $C_{LC2}$ due to the auxiliary capacitor $C_{AUX}$, and is described by the following Equation 1.

$$V2 = \frac{C_{AUX}}{(C_{AUX} + C_{LC2})} V \qquad \text{[Equation 1]}$$

Each of the capacitors $C_{AUX}$ and $C_{LC2}$ and the capacitance thereof are denoted by the same reference characters.

Figure 10:
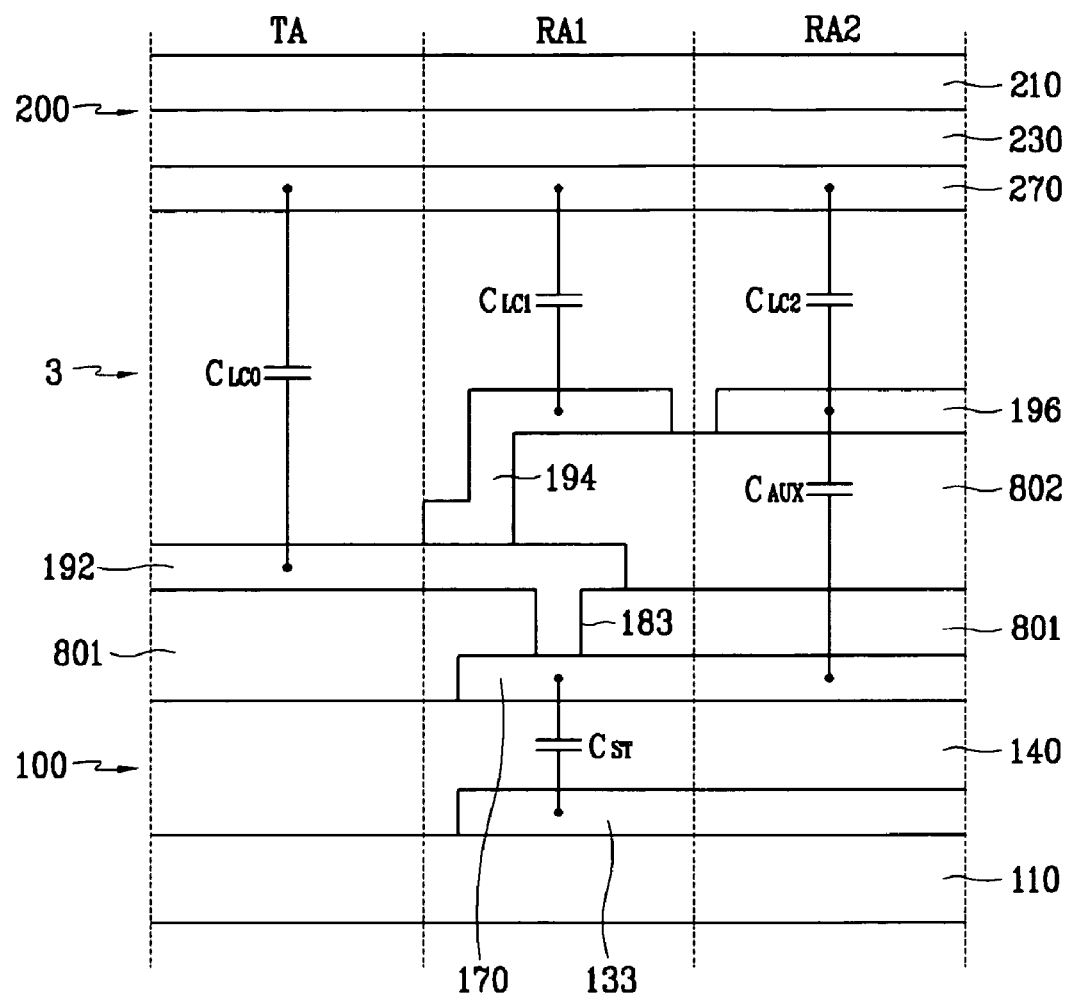

The voltage-transmittance curve VT shown in FIG. 4 represents the variation of luminance in the transmissive region TA with respect to the variation of the pixel voltage V, and the first voltage-reflection curve VR1 represents the variation of luminance in the reflective region RA with respect to variation of the pixel voltage V. The voltage-transmittance curve VT and the first voltage-reflection curve VR1 are obtained based on measured data from test panels. In the test panel, the reflective region has only one reflective region, that is, the first reflective region RA1, which is enlarged to the second reflective region RA2. The second voltage-reflection curve VR2 is obtained based on data generated by calculating the data for the first reflection curve VR1 using Equation 1. The third voltage-reflection curve VR3 is obtained by synthesizing the first voltage-reflection curve VR1 and second voltage-reflection curve VR2. The resulting curves VT, VR1, and VR2 in FIG. 10 are defined by area ratios of the first reflective region RA1 and the reflective region RA2.

When the first voltage-reflection curve VR1, the second voltage-reflection curve VR2, and the third voltage-reflection curve VR3 are respectively represented by functions R1(V), R2(V), and R3(V), the function R3(V) is obtained through Equation 2 below.

$$R3(v) = (1 - AR) \cdot RA1(V) + AR \cdot RA2(V) \qquad \text{[Equation 2]}$$
$$= (1 - AR) \cdot RA1(V) + AR \cdot RA1(kV)$$

Here, $$AR = \frac{A2}{(A1 + A2)},$$

$$k = \frac{C_{AUX}}{(C_{AUX} + C_{LC2})},$$

and A1 and A2 represent areas of the first and second reflective regions RA1 and RA2, respectively. That is, AR represents an area ratio of the second reflective region RA2 with respect to the entire reflective region, and k represents a voltage ratio of the voltage V2 across the second reflective LC capacitor $C_{LC2}$ with respect to the pixel voltage V.

A simulation was performed by varying the area ratio AR and the voltage ratio k to achieve a third voltage-reflection curve VR3, which is most similar to the voltage-transmittance curve VT.

Referring to the result of the simulation, when the area ratio AR is about 0.6 and the voltage ratio k is about 0.82, the third voltage-reflection curve VR3, which is most similar to the voltage-transmittance curve VT, was obtained as shown in FIG. 4.

In the meantime, the capacitance of the auxiliary capacitor $C_{AUX}$ for causing the voltage ratio k to be about 0.82 is calculated by the following Equation 3.

$$0.82 = \frac{C_{AUX}}{(C_{AUX} + C_{LC2})} \quad \text{[Equation 3]}$$

$$C_{AUX} ≅ 1/2 \; 4.56 \; C_{LC2}$$

That is, the capacitance of the auxiliary capacitor $C_{AUX}$ becomes 4.56 times the capacitance of the second reflective LC capacitor $C_{LC2}$.

The relationship of the capacitance of a capacitor, and area A of electrodes forming the capacitor, distance d between the electrodes, and a dielectric constant ∈ are represented as the following Equation 4.

$$C = \varepsilon \frac{A}{d} \quad \text{[Equation 4]}$$

The dielectric constant ∈ of SiNx mainly used as an insulating layer in the LCD and an dielectric constant $\varepsilon_{LC}$ of the LC molecules are similar. Thereby, when the electrode areas of the second reflective LC capacitor $C_{LC2}$ and the auxiliary capacitor $C_{AUX}$ are substantially equal to each other, a thickness $d_{SiNx}$ of an insulating layer of the auxiliary capacitor $C_{AUX}$ is substantially calculated by the following Equation 5.

$$\frac{\varepsilon_{SiNx}}{d_{SiNx}} = 4.56 \; \frac{\varepsilon_{LC}}{d_{LC}} \quad \text{[Equation 5]}$$

$$d_{SiNx} = \frac{1}{4.56} \frac{\varepsilon_{SiNx}}{\varepsilon_{LC}} d_{LC}$$

$$d_{SiNx} = \frac{1}{4.56} d_{LC}$$

Here, $d_{LC}$ is a thickness of the LC layer of the second reflective LC capacitor $C_{LC2}$.

When the thickness $d_{LC}$ of the LC layer was 3 μm, the thickness of the insulating layer $d_{SiNx}$ was 0.66 μm. However, since it is difficult to form the insulating layer that is as thin as 0.66 μm, the capacitance of the auxiliary capacitor $C_{AUX}$ and the area of the electrodes may be calculated by Equation 3, if necessary. For example, as shown in FIG. 3, by adjusting the overlapping area of the output electrode 170 and the auxiliary electrode 193 and a thickness of the first insulating layer 801, the desired capacitance of the auxiliary capacitor $C_{AUX}$ may be obtained.

Figure 5:
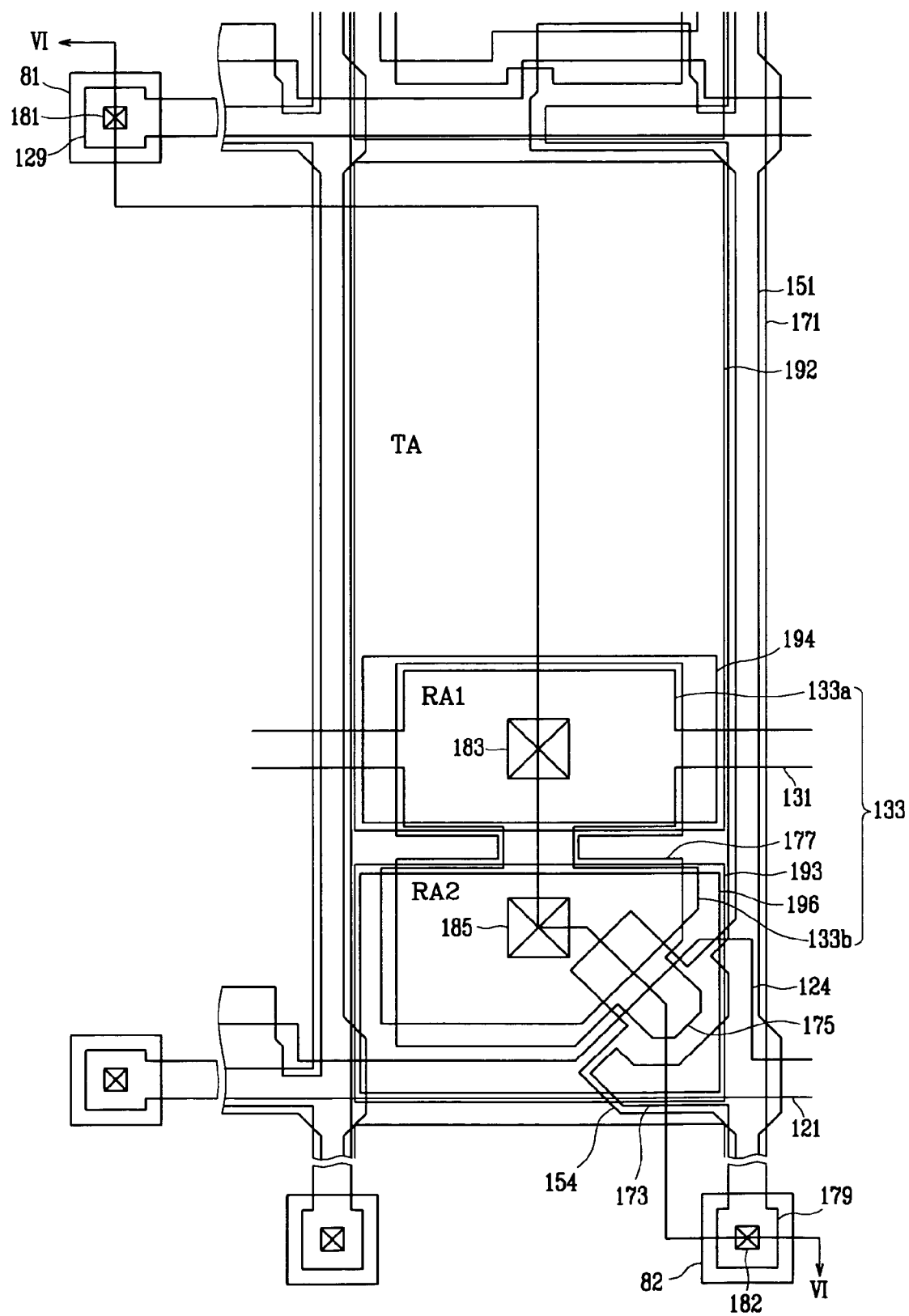
FIG. 5 is a layout view of an example of the LCD shown in FIG. 3.
Figure 6:
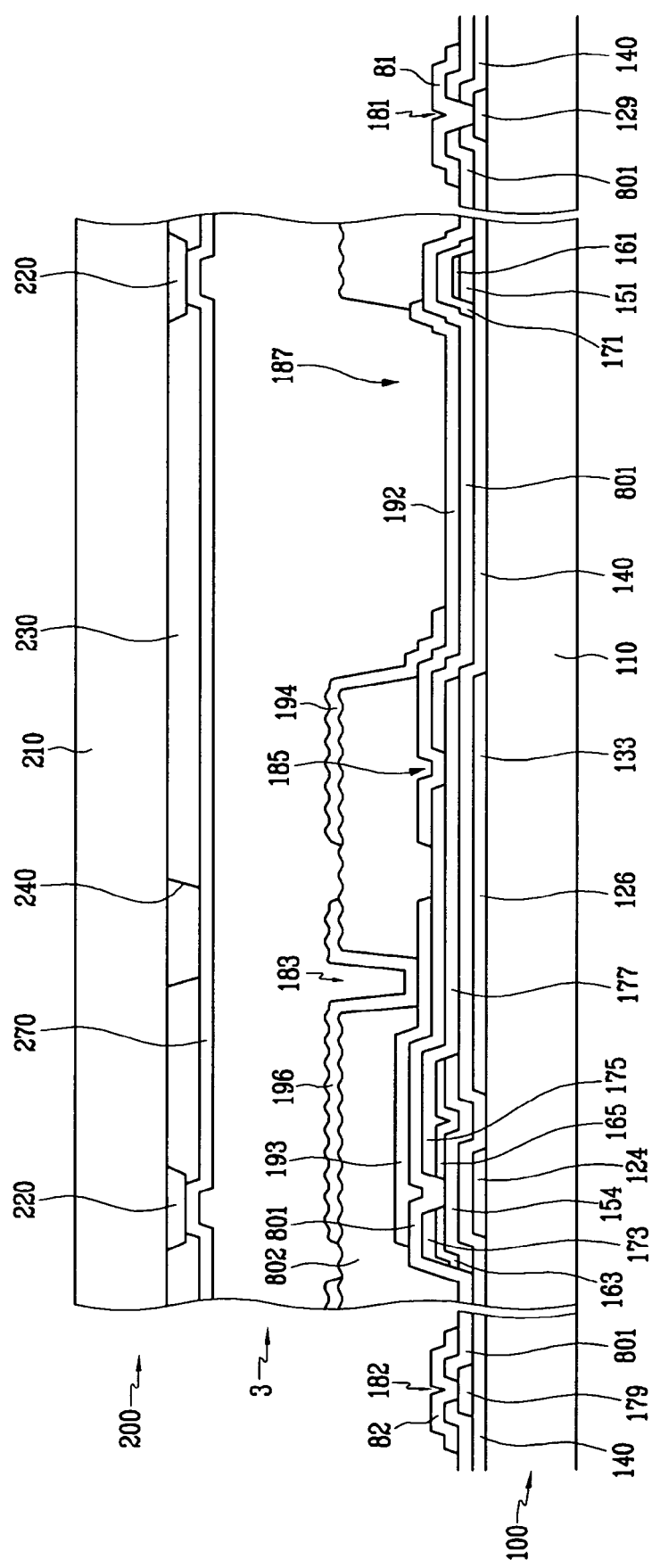
FIG. 6 is a sectional view taken along the line VI-VI of FIG. 5.

Referring to FIGS. 5 and 6, an example of an LCD according to an embodiment of the present invention will be described in detail.

FIG. 5 is a layout view of an example of the LCD shown in FIG. 3, and FIG. 6 is a sectional view taken along the line VI-VI of FIG. 5.

The LCD includes a TFT array panel 100, a common electrode panel 200 positioned in a plane that is substantially parallel to the TFT array panel 100, and an LC layer 3 interposed between the panels 100 and 200. The LC layer 3 contains LC molecules (not shown) arranged in a vertical direction or in a horizontal direction.

First, referring to FIGS. 5 and 6, the TFT array panel 100 will be described.

A plurality of gate lines 121 and storage electrode lines 131 are formed on an insulating substrate 110 made of a material such as transparent glass or plastic.

The gate lines 121 transmit gate signals and extend substantially in the first direction. Each of the gate lines 121 includes a plurality of gate electrodes 124 that extend perpendicularly to the general direction of the gate lines 121 and an end portion 129 having a large area for contact with another layer or an external driving circuit. A gate driving circuit (not shown) for generating the gate signals may be mounted on a flexible printed circuit (FPC) film (not shown), which may be attached to the substrate 110, directly mounted on the substrate 110, or integrated with the substrate 110. The gate lines 121 may extend to be connected to a driving circuit that is integrated on the substrate 110.

The storage electrode lines 131 are supplied with a predetermined voltage such as a common voltage applied to a common electrode 270 and extend substantially parallel to the gate lines 121. Each of the storage electrode lines 131 is disposed between two gate lines 121 and is closer to one of the gate lines than the other. Each of the storage electrode lines 131 includes a portion that is wider than the rest of the line to form storage electrodes 133. Each of the storage electrodes 133 includes a first storage electrode 133a disposed on a first reflective region RA1 and a second storage electrode 133b disposed on a second reflective region RA2. The first and second storage electrodes 133a and 133b are connected with a bridge. As the bridge does not extend the full length of the first and the second storage electrodes 133a, 133b, parts of the first and the second storage electrodes 133a and 133b that are not connected by the bridge are separated by a gap between the first and the second storage electrodes 133a, 133b. In some embodiments, the storage electrode 133 may be formed as a single piece that extends in the first and second reflective regions RA1 and RA2. The invention is not limited to any particular shape or configuration of the storage electrode lines 131.

The gate lines 121 and the storage electrode lines 131 are preferably made of an Al-containing metal (such as Al or an Al alloy), an Ag-containing metal (such as Ag and or a Ag alloy, a Cu-containing metal (such as Cu or a Cu alloy), a Mo-containing metal (such as Mo or a Mo alloy), Cr, Ta, or Ti. In some embodiments, the gate lines 121 and the storage electrode lines 131 have a multi-layered structure including two conductive films (not shown) having different physical characteristics. In these embodiments, one of the two films is preferably made of a low resistivity metal including an Al-containing metal, a Ag-containing metal, and a Cu-containing metal for reducing signal delay or voltage drop. The other film is preferably made of a material such as a Mo-containing metal, Cr, Ta, or Ti, which has good physical, chemical, and electrical contact characteristics with other materials such as indium tin oxide (ITO) or indium zinc oxide (IZO). An example of a multi-layered structure has a lower Cr film and an upper Al (alloy) film or a lower Al (alloy) film and an upper Mo (alloy) film. The metals and conductors listed herein are, however, not intended to be an exhaustive list of materials from which the gate lines 121, the storage electrode lines 131, and the auxiliary electrodes 126 may be made.

The lateral sides of the gate lines 121 and the storage electrode lines 131 are inclined to form inclination angles in the range of about 30 to 80 degrees with respect to the substrate 110.

A gate insulating layer 140 preferably made of silicon nitride (SiNx) or silicon oxide (SiOx) is formed on the gate lines 121 and the storage electrode lines 131.

A plurality of semiconductor stripes 151 preferably made of hydrogenated amorphous silicon (abbreviated to "a-Si") or polysilicon are formed on the gate insulating layer 140. Each of the semiconductor stripes 151 extends substantially in the second direction and expands at certain portions to form a plurality of projections 154. In the embodiment shown, at least some of the projections 154 expand over the gate electrodes 124. The semiconductor stripes 151 become wide near the gate lines 121 such that the semiconductor stripes 151 cover a part of the gate lines 121.

A plurality of ohmic contact stripes and islands 161 and 165 are formed on the semiconductor stripes 151. The ohmic contact stripes and islands 161 and 165 are preferably made of n+ hydrogenated a-Si heavily doped with an n-type impurity such as phosphorus, or they may be made of silicide. Each ohmic contact stripe 161 includes a plurality of projections 163, and the projections 163 and the ohmic contact islands 165 are located in pairs on the projections 154 of the semiconductor stripes 151.

The lateral sides of the semiconductor stripes 151 and the ohmic contacts 161 and 165 are inclined to form inclination angles that are preferably in the range of about 30 to 80 degrees with respect to the substrate 110.

A plurality of data lines 171 and a plurality of drain electrodes 175 are formed on the ohmic contacts 161 and 165 and the gate insulating layer 140.

The data lines 171 transmit data signals and extend substantially in the second direction, perpendicularly to the gate lines 121 and the storage electrode lines 131. Each data line 171 includes a plurality of source electrodes 173 projecting substantially perpendicularly to the data lines 171 and an end portion 179 having a large area for contact with another layer or an external driving circuit. A data driving circuit (not shown) for generating the data signals may be mounted on an FPC film (not shown), which may be attached to the substrate 110, directly mounted on the substrate 110, or integrated with the substrate 110. The data lines 171 may extend to be connected to a driving circuit that may be integrated with the substrate 110.

The drain electrodes 175 are separated from the data lines 171 and are disposed opposite the source electrodes 173 with respect to the gate electrodes 124. Each of the drain electrodes 175 has a wide portion 177 and a narrow end portion. The narrow end portion is partly enclosed by a source electrode 173. The wide portion 177 includes two rectangular portions overlapping the first and second storage electrodes 133a and 133b, respectively, and a connection connecting the two rectangular portions. The connection is smaller than the two rectangular portions, and only connects to certain part of the rectangular portions. The shape of the wide portion 177 is similar to that of the storage electrode 133. However, the two rectangular portions of the wide portion 177 may be formed over the first and second reflective regions RA1 and RA2 in any configuration. The gate electrode 124, the source electrode 173, and the drain electrode 175 along with the projection 154 of a semiconductor stripe 151 form a TFT having a channel formed in the projection 154 disposed between the source electrode 173 and the drain electrode 175.

The data lines 171 and the drain electrodes 175 are preferably made of a refractory metal such as Cr, Mo, Ta, Ti, or alloys thereof. In some embodiments, they may have a multilayered structure including a refractory metal film (not shown) and a low resistivity film (not shown). An example of a two-layered structure includes a lower Cr/Mo (alloy) film and an upper Al (alloy) film. An example of a triple-layered structure includes a lower Mo (alloy) film, an intermediate Al (alloy) film, and an upper Mo (alloy) film. The metals or conductors provided herein are exemplary and not intended to be an exhaustive list of materials from which the data lines 171 and the drain electrodes 175 may be made.

The data lines 171 and the drain electrodes 175 have inclined side walls that form inclination angles in the range of about 30 to 80 degrees with respect to the substrate 110.

The ohmic contacts 161 and 165 are interposed between the underlying semiconductor stripes 151 and the overlying conductors 171 and 175, and reduce the contact resistance between the underlying layer and the overlying layer. Although the semiconductor stripes 151 are narrower than the data lines 171 in most places, the semiconductor stripes 151 become wider near the gate lines 121 as described above, to smooth the profile of the surface, thereby preventing the disconnection of the data lines 171. The semiconductor stripes 151 include portions that are not covered with the data lines 171, the source electrode 173, or the drain electrodes 175, such as portions located between the source electrodes 173 and the drain electrodes 175 (shown as projection 154 in FIG. 6).

A first passivation layer 801 is formed on the data lines 171, the drain electrodes 175, and the portions of the semiconductor stripes 151 that are not covered with the source/drain electrode. The passivation layer includes a plurality of contact holes 182 and 185 exposing the end portions 179 and the wide portions 177 of the data lines 171, respectively. The passivation layer 801 and the gate insulating layer 140 have a plurality of contact holes 181 exposing the end portions 129 of the gate lines 121.

The transmissive electrodes 192 and the auxiliary electrodes 193 separated from the transmissive electrodes 192 are formed on the passivation layer 801. These electrodes are preferably made of a transparent conductor such as ITO or IZO, or a conductive polymer. The transmissive electrodes 192 are connected to the wide portions 177 of the drain electrodes 175 through the contact holes 185 and are formed in the transmissive regions TA and first reflective regions RA1. The auxiliary electrodes 193 are formed in the second reflective regions RA2.

A second passivation layer 802 is formed on the transmissive electrodes 192 and the auxiliary electrodes 193. The second passivation layer 802 is preferably made of an organic insulator having a good flatness characteristic and photosensitivity. The second passivation layer 802 has an embossed surface.

The second passivation film 802 is removed from the end portions 129 and 179 of the gate lines 121 and the data lines 171, respectively, to form holes that extend to the first passivation film 801.

The second passivation layer 802 has a plurality of contact holes 183 exposing portions of the auxiliary electrodes 193 and a plurality of openings 187 exposing the transmissive electrodes 192 in the transmissive regions TA.

The contact holes 181, 182, 183, and 185 may have various shapes such as a polygon or a circle, and they may have side walls that are inclined by about 30 to 80 degrees relative to the surface of the substrate 110. In some embodiments, the side walls are vertical relative to the substrate 110 (forming an angle of approximately 90 degrees with respect to the substrate 110).

First reflective electrodes 194, second reflective electrodes 196 separated from the first reflective electrodes 194, and a plurality of contact assistants 81 and 82 are formed on the second passivation layer 802. The first reflective electrodes 194 are conformally coated on the area around a sidewall of the opening 187, to electrically connect to a transmissive electrode 192 and connect to an auxiliary electrode 193 via a contact hole 183. The first and second reflective electrodes 194 and 196 also have embossed surfaces along the embossed surface of the second passivation layer 802. The embossed surfaces of the first and second reflective electrodes 194 and 196 induce diffused reflection of light passing therethrough, to prevent a reflection onto a screen.

The reflective electrodes 194 and 196 are preferably made of an opaque and reflective conductor such as Al, Ag, or alloys thereof.

A pixel is divided into the transmissive region TA and the first and second reflective regions RA1 and RA2. The transmissive region TA is a region where the transmissive electrode 192 is at the bottom of the opening 187. The first reflective region RA1 is a region where the first reflective electrode 194 is disposed and the second reflective region RA2 is a region where the second reflective electrode 196 is disposed. In a single pixel, the transmissive region TA, the first reflective region RA1, and the second reflective region RA2 are sequentially disposed from a previous gate line 121. The cell gap in the transmissive region TA is about two times larger than the cell gaps in the first and second reflective regions RA1 and RA2, due to the presence of the opening 187.

The transmissive electrodes 192 are physically and electrically connected to the wide portion 177 of the drain electrodes 175 through the contact holes 185 such that the transmissive electrodes 192 receive data voltages from the drain electrodes 175 and transmit it to the first reflective electrode 194. The transmissive electrodes 192 and the first reflective electrodes 194, which are supplied with the data voltages, generate an electric field in cooperation with a common electrode 270 of the common electrode panel 200 that is supplied With a common voltage. The electric field determines the orientations of LC molecules (not shown) in the LC layer 3 disposed between the electrodes 192 and 194 and the common electrode 270. The orientations of the LC molecules adjust the polarization of the light passing through the LC layer 3.

The transmissive electrode 192 and the common electrode 270 form a transmissive LC capacitor $C_{LO0}$. The first reflective electrode 194 and the common electrode 270 form a first reflective LC capacitor $C_{LC1}$. The transmissive LC capacitor $C_{LO0}$ and the first reflective LC capacitor $C_{LO1}$ store applied voltages after the TFT is turned off.

The wide portion 177 of a drain electrode 175 overlaps the storage electrode 133 to form a storage capacitor $C_{ST}$, which enhances the voltage storing capacity of the LC capacitors $C_{LC0}$ and $C_{LC1}$. The storage capacitor $C_{ST}$ is connected to the LC capacitors $C_{LC0}$ and $C_{LC1}$. The storage capacitor $C_{ST}$ may be formed by extending the transmissive electrode 192 over a previous gate line 121 that is adjacent to the transmissive electrode 192. If desired, the storage electrode lines 131 may be omitted. Since the storage electrodes 133 and the wide portions 177 of the drain electrodes 175 extend over the first and second reflective regions RA1 and RA2, a high capacitance of the storage capacitor $C_{ST}$ is obtained.

The wide portion 177 of a drain electrode 175 extends over an auxiliary electrode 193 to form the auxiliary capacitor $C_{AUX}$. The auxiliary electrodes 193 receive voltages that are lower than the data voltages from the drain electrodes 175 due to the presence of the auxiliary capacitors $C_{AUX}$.

The second reflective electrodes 196 are physically and electrically connected to the auxiliary electrode 193 through the contact holes 183 such that the second reflective electrodes 196 receive voltages that are lower than the data voltage through the auxiliary capacitors $C_{AUX}$.

The second reflective electrodes 196 that are supplied with voltages that are lower than the data voltages generate electric fields in cooperation with the common electrode 270. As explained above, the electric fields determine the orientation of the LC molecules in the LC layer 3. The second reflective LC capacitor $C_{LC2}$ is formed between the second reflective electrodes 196 and the common electrode 270 and connected to the auxiliary capacitor $C_{AUX}$.

In some embodiments, the second reflective electrodes 196 extend over the gate lines 121 to enhance the reflection. In other embodiments, the transmissive electrodes 192 and the first and second reflective electrodes 194 and 196 do not extend over the neighboring data lines 171 may overlap the data lines 171 for enhancing the aperture ratio and the reflection.

The contact assistants 81 and 82 are connected to the end portions 129 of the gate lines 121 and the end portions 179 of the data lines 171 through the contact holes 181 and 182, respectively. The contact assistants 81 and 82 protect the end portions 129 and 179 and enhance the adhesion between the end portions 129 and 179 and external devices.

A description of the common electrode panel 200 follows.

A light blocking member 220 for preventing light leakage, sometimes referred to as a black matrix, is formed on an insulating substrate 210 that is made of a material such as transparent glass or plastic.

The light blocking member 220 has a plurality of openings (not shown) that are positioned to align with the transmissive electrodes 192 and the first and second reflective electrodes 194 and 196 and prevent light leakage between two adjacent pixels.

A plurality of color filters 230 are also formed on the substrate 210, and they are disposed substantially in the areas enclosed by the light blocking member 220. The color filters 230 that are disposed between two adjacent data lines 171 and extend substantially in the second direction may be connected to each other, to form stripes. Each of the color filters 230 may represent one of the primary colors such as red, green, and blue.

The color filters 230 formed in the transmissive regions TA and the color filters 230 formed in the first and second reflective regions RA1 and RA2 have substantially equal thickness. Each of the color filters 230 in the reflective regions RA1 and RA2 includes light holes 240. The light holes 240 reduce the effects of the difference in color tones between the reflective regions RA1 and RA2 and the transmissive region TA caused by different amounts of light transmitting through the different color filters 230. In some embodiments, the color tones may be equalized by changing the thicknesses of the color filters 230 in the transmissive region TA and the reflective regions RA1 and RA2. Fillers are deposited in the light holes 240 to planarize the surfaces of the color filters 230, thereby reducing any formation of steps due to the presence of the light holes 240.

A common electrode 270 is formed on the color filters 230 and the light blocking members 220. The common electrode 270 is preferably made of a transparent conductive material such as ITO or IZO.

Alignment layers (not shown) may be coated on inner surfaces of the panels 100 and 200, and polarizers (not shown) may be provided on outer surfaces of the panels 100 and 200.

Another example of layered structures of the LCD shown in FIG. 2 will be described with reference to FIGS. 7 to 10.

FIGS. 7 to 10 show other examples of a sectional view of the LCD shown in FIG. 2, respectively.

Figure 7:
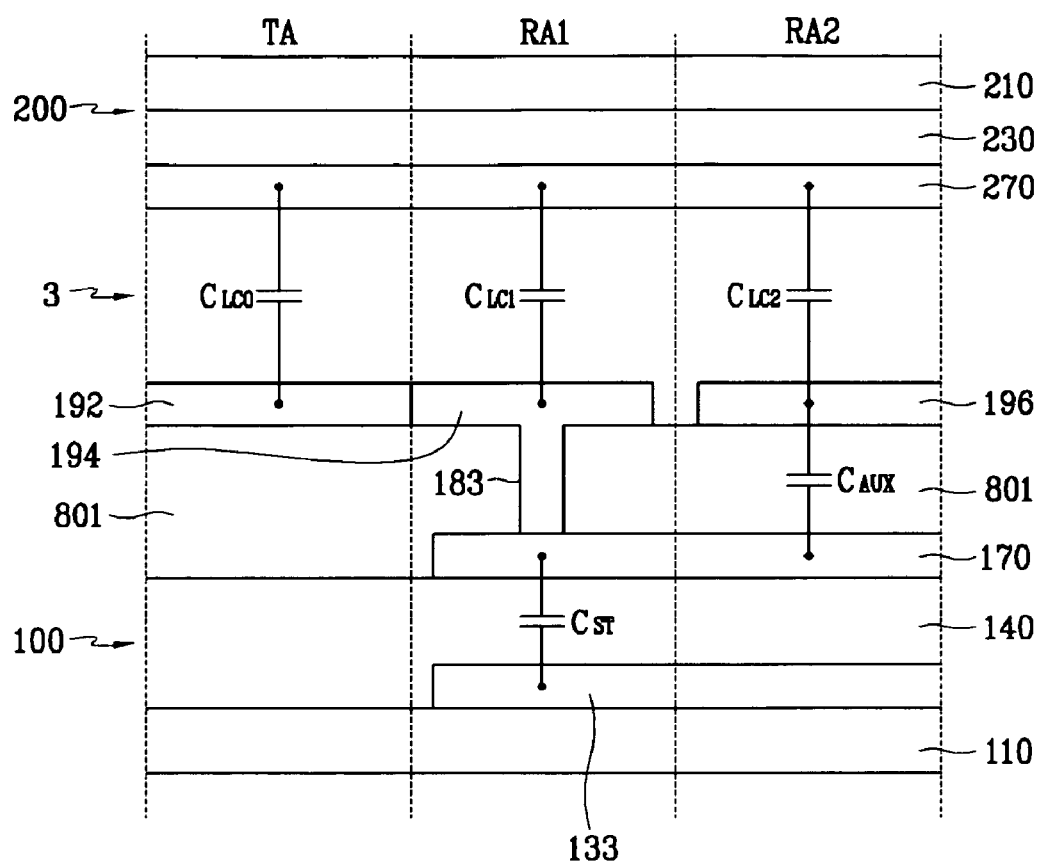
FIGS. 7 to 10 show other examples of a sectional view of the LCD shown in FIG. 2, respectively.

Referring to FIG. 7, the TFT array panel 100 has the storage electrode 133 formed on the insulating substrate 110 and the gate insulating layer 140 formed on the storage electrode 133. The output electrode 170 of a switching element Q is formed on the gate insulating layer 140. The storage capacitor $C_{ST}$ includes the storage electrode 133 and the output electrode 170 that is disposed over the storage electrode 133. The insulating layer 801 is formed on the output electrode 170. The insulating layer 801 may have an embossed surface. The insulating layer 801 has the contact hole 183.

A transmissive electrode 192 and first and second reflective electrodes 194 and 196 are formed on the insulating layer 801. The first reflective electrode 194 is physically and electrically connected to the output electrode 170 through the contact hole 183 and is connected to the transmissive electrode 192, but is separated from the second reflective electrode 196.

An auxiliary capacitor $C_{AUX}$ includes the second reflective electrode 196 and the output electrode 170, which overlaps the second reflective electrode 196 via the insulating layer 801.

The common electrode panel 200 includes a color filter 230 formed on an insulating substrate 210 and a common electrode 270 formed on the color filter 230. An LC layer 3 is interposed between the TFT array panel 100 and the common electrode panel 200.

The transmissive LC capacitor $C_{LC0}$ includes the common electrode 270 and the transmissive electrode 192 as two terminals, and the LC layer 3 functions as the dielectric layer of the transmissive LC capacitor $C_{LC0}$. First and second reflective LC capacitors $C_{LC1}$ and $C_{LC2}$ include the first and second reflective electrodes 194 and 196 and the common electrode 270 as two terminals, respectively, with the LC layer 3 functioning as the dielectric layer of the first and second reflective LC capacitors $C_{LC1}$ and $C_{LC2}$ as well. The cell gaps in the transmissive region TA and the first and second reflective regions TA1 and TA2 are substantially equal to each other.

Since the storage electrode 133 is formed on the layer under the output electrode 170 and the second reflective electrode 196 is formed on the layer that is above the output electrode 170, the storage electrode 133 may be formed widely to overlap the total output electrode 170, regardless of the arrangement of the second reflective electrode 196. Moreover, although the output electrode 170 may be formed widely over the first and second reflective regions RA1 and RA2, the output electrode 170 may not influence the aperture ratio of the transmissive region TA. Therefore, the kickback voltage decreases by sufficiently increasing the capacitance of the storage capacitor $C_{ST}$. This decrease in kickback voltage prevents image deterioration such as the flicker phenomenon.

Another example of layered structures of the LCD shown in FIG. 2 will be described with reference to FIG. 8.

Figure 8:
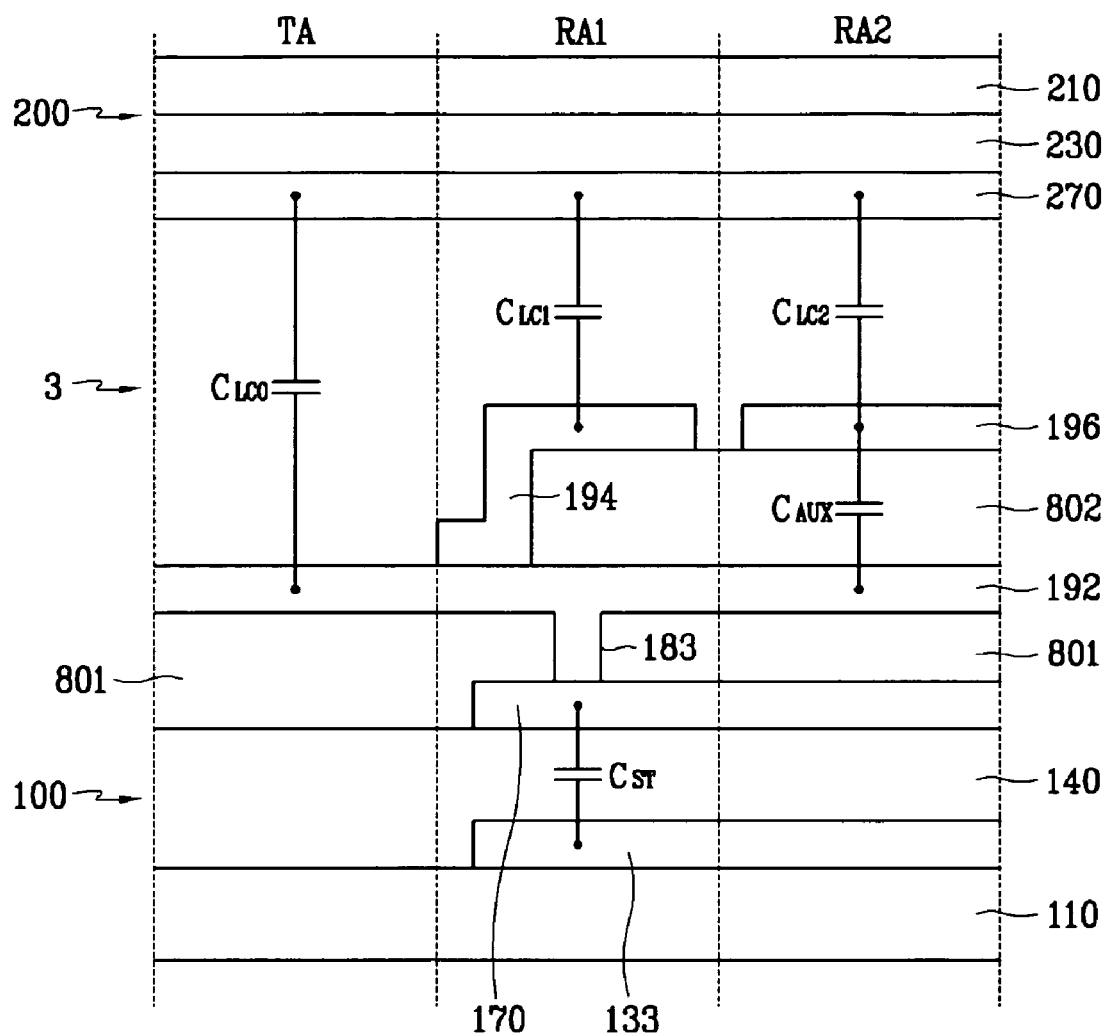

Referring to FIG. 8, the TFT array panel 100 has the storage electrode 133 formed on the insulating substrate 110, and the gate insulating layer 140 formed on the storage electrode 133. The output electrode 170 of the switching element Q is formed on the gate insulating layer 140. The storage capacitor $C_{ST}$ includes the storage electrode 133 and the output electrode 170 that overlaps the storage electrode 133. The first insulating layer 801 is formed on the output electrode 170, and it includes a contact hole 183. The transmissive electrode 192 is formed on the first insulating layer 801. The transmissive electrode 192 is physically and electrically connected to the output electrode 170 through the contact hole 183. The second insulating layer 802 is formed on the transmissive electrode 192 in the first and second reflective regions RA1 and RA2, and it may have an embossed surface. First and second reflective electrodes 194 and 196 are formed on the second insulating layer 802. The first reflective electrode 194 is connected to the transmissive electrode 192 but is separated from the second reflective electrode 196. An auxiliary capacitor $C_{AUX}$ includes the transmissive electrode 192 and the second reflective electrode 196, which sandwiches the second insulating layer 802 with the transmissive electrode 192.

The common electrode panel 200 includes the color filter 230 formed on the insulating substrate 210 and the common electrode 270 formed on the color filter 230. The LC layer 3 is interposed between the TFT array panel 100 and the common electrode panel 200.

The transmissive LC capacitor $C_{LC0}$ includes the common electrode 270 and the transmissive electrode 192 as two terminals, and the LC layer 3 functions as the dielectric layer of the transmissive LC capacitor $C_{LC0}$. The first and second reflective LC capacitors $C_{LC1}$ and $C_{LC2}$ include the first and second reflective electrodes 194 and 196 and the common electrode 270 as two terminals, respectively, and the LC layer 3 functions as the dielectric layer for the first and second reflective LC capacitors $C_{LC1}$ and $C_{LC2}$ as well. The transmissive region TA has a different height than the first and second reflective regions RA1 and RA2 because of the second insulating layer 802 being formed only in the first and second reflection regions RA1, RA2. Since the storage electrode 133 is formed on the layer that is under the output electrode 170 and the transmissive electrode 192 is formed on the layer that is above the output electrode 170, the storage electrode 133 may be formed widely to overlap the entire output electrode 170, regardless of the arrangement of the transmissive electrode 192. Moreover, although the output electrode 170 may extend widely over the first and second reflective regions RA1 and RA2, the output electrode 170 may not influence the aperture ratio of the transmissive region TA. Therefore, the kickback voltage decreases by sufficiently increasing the capacitance of the storage capacitor $C_{ST}$. This decrease in kickback voltage prevents image deterioration such as the flicker phenomenon.

Further another example of layered structures of the LCD shown in FIG. 2 will be described with reference to FIG. 9.

Figure 9:
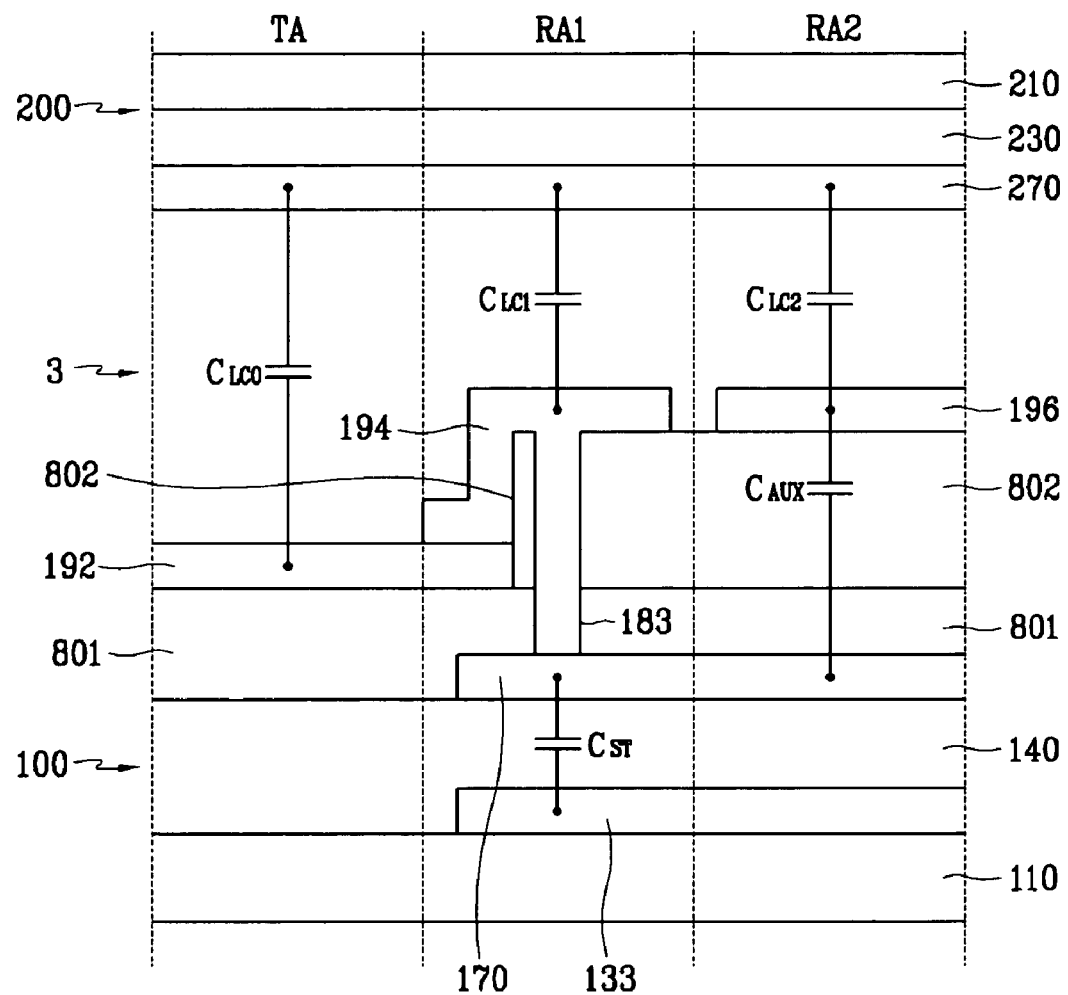

Referring to FIG. 9, the TFT array panel 100 has a storage electrode 133 formed on an insulating substrate 110, and a gate insulating layer 140 formed on the storage electrode 133. The output electrode 170 of the switching element Q is formed on the gate insulating layer 140. The storage capacitor $C_{ST}$ includes the storage electrode 133 and the output electrode 170 that overlaps the storage electrode 133.

The first insulating layer 801 is formed on the output electrode 170. The transmissive electrode 192 is formed on the first insulating layer 801 in the transmissive region TA and a portion of the first reflective region RA1, but is not formed in the second reflective region RA2. The second insulating layer 802 is formed on the first insulating layer 801 in the first and second reflective regions RA1 and RA2, and first and second reflective electrodes 194 and 196 are formed on the second insulating layer 802. The second insluting layer 802 has an embossed surface. The first and second insulating layers 801 and 802 include a contact hole 183 that extends through both of the insulating layers. The first reflective electrode 194 is physically and electrically connected to the output electrode 170 through the contact hole 183, in contact with the transmissive electrode 192, and separated from the second reflective electrode 196. The auxiliary capacitor $C_{AUX}$ includes the output electrode 170 and the second reflective electrode 196, which overlaps the output electrode 170 via the first and second insulating layers 801 and 802.

The common electrode panel 200 includes the color filter 230 formed on the insulating substrate 210 and the common electrode 270 formed on the color filter 230. As in the above-described embodiments, the LC layer 3 is interposed between the TFT array panel 100 and the common electrode panel 200.

The transmissive LC capacitor $C_{LC0}$ includes the common electrode 270 and the transmissive electrode 192 as two terminals, and the LC layer 3 functions as the dielectric layer of the transmissive LC capacitor $C_{LC0}$. First and second reflective LC capacitors $C_{LC1}$ and $C_{LC2}$ include the first and second reflective electrodes 194 and 196 and the common electrode 270 as two terminals, respectively, and the LC layer 3 functions as the dielectric layer for the first and second reflective LC capacitors $C_{LC1}$ and $C_{LC2}$ as well. The transmissive region TA has a height that is different from that of the first and second reflective regions RA1 and RA2 occurs because of the second insulating layer 802 being formed only in the reflective regions RA1, RA2. Since the storage electrode 133 is formed on the layer (140) that is under the output electrode 170 and the second reflective electrode 196 is formed on the layer that extends over the output electrode 170, the storage electrode 133 may be formed widely to overlap the total output electrode 170, regardless of the arrangement of the second reflective electrode 196. Moreover, although the output electrode 170 may be formed widely over the first and second reflective regions RA1 and RA2, the output electrode 170 does not affect the aperture ratio of the transmissive region TA. Thereby, the kickback voltage decreases by sufficiently increasing the capacitance of the storage capacitor $C_{ST}$, to prevent image deterioration such as the flicker phenomenon due to the kickback voltage.

Another example of layered structures of the LCD shown in FIG. 2 will be described with reference to FIG. 10.

Referring to FIG. 10, the TFT array panel 100 has the storage electrode 133 formed on the insulating substrate 110, and the gate insulating layer 140 formed on the storage electrode 133. The output electrode 170 of the switching element Q is formed on the gate insulating layer 140. The storage capacitor $C_{ST}$ includes the storage electrode 133 and the output electrode 170 that overlaps the storage electrode 133. The first insulating layer 801 is formed on the output electrode 170, and it includes the contact hole 183. The transmissive electrode 192 is formed on the first insulating layer 801. The transmissive electrode 192 is physically and electrically connected to the output electrode 170 through the contact hole 183. The second insulating layer 802 is formed on the transmissive electrode 192 and the first insulating layer 801 in the first and second reflective regions RA1 and RA2, and first and second reflective electrodes 194 and 196 are formed on the second insulating layer 802. The second insulting layer 802 has an embossed surface. The first reflective electrode 194 is connected to the transmissive electrode 192 and separated from the second reflective electrode 196. An auxiliary capacitor $C_{AUX}$ includes the output electrode 170 and the second reflective electrode 196, which overlaps the output electrode 170 via the first and second insulating layers 801 and 802.

The common electrode panel 200 includes the color filter 230 formed on the insulating substrate 210 and the common electrode 270 formed on the color filter 230. The LC layer 3 is interposed between the TFT array panel 100 and the common electrode panel 200.

The transmissive LC capacitor $C_{LC0}$ includes the common electrode 270 and the transmissive electrode 192 as two terminals, and the LC layer 3 functions as an insulator of the transmissive LC capacitor $C_{LC0}$. First and second reflective LC capacitors $C_{LC1}$ and $C_{LC2}$ include the first and second reflective electrodes 194 and 196 and the common electrode 270 as two terminals, respectively, and the LC layer 3 functions as the dielectric layer of the first and second reflective LC capacitors $C_{LC1}$ and $C_{LC2}$ as well. The transmissive region TA has a height that is different from that of the first and second reflective regions RA1 and RA2 because of the second insulating layer 802 only being in the reflection regions RA1, RA2. Since the storage electrode 133 is formed on the layer under the output electrode 170 and the second reflective electrode 196 is formed on the layer above the output electrode 170, the storage electrode 133 may be formed widely to overlap the entire output electrode 170, regardless of the arrangement of the second reflective electrode 196. Moreover, although the output electrode 170 may be formed widely over the first and second reflective regions RA1 and RA2, the output electrode 170 does not affect the aperture ratio of the transmissive region TA. Thereby, the kickback voltage decreases by sufficiently increasing capacitance of the storage capacitor $C_{ST}$, to prevent image deterioration such as the flicker phenomenon due to the kickback voltage.

According to the present invention, each reflective region is divided into two sub-regions. A data voltage is applied to one of the two sub-regions and a voltage that is lower than the data voltage is applied to the other sub-region. This way, an LCD having gamma curves of the reflective mode matching the gamma curves of the transmissive mode and having a substantially uniform cell gap is provided.

Since the storage capacitor and the auxiliary capacitor are formed on two sides of an output electrode, respectively, the situation where the capacitance of one of the two capacitors decreases as the capacitance of the other capacitor increases is avoided. Thus, since it is possible to increase capacitance of the storage capacitor, the flicker is prevented.

Although preferred embodiments of the present invention have been described in detail hereinabove, it should be clearly understood that many variations and/or modifications of the basic inventive concepts herein taught, which may appear to those skilled in the present art, will still fall within the spirit and scope of the present invention, as defined in the appended claims.

What is claimed is:

1. A thin film transistor (TFT) array panel comprising:
    a substrate;
    a gate line formed on the substrate and having a gate electrode;
    a storage electrode line formed on the substrate and having a storage electrode;
    a gate insulating layer formed on the storage electrode line and the gate line;

a semiconductor formed on the gate insulating layer and overlapping the gate electrode;
a data line formed on the gate insulating layer, connected to a source electrode extending over the semiconductor and extending substantially perpendicularly to the gate line;
a drain electrode formed on the semiconductor, the drain electrode being positioned across the semiconductor from the source electrode and overlapping the storage electrode;
a first insulating layer formed on the data line and the drain electrode and having a first contact hole extending through the first insulating layer to the drain electrode;
a transmissive electrode formed on the first insulating layer and connected to the drain electrode via the first contact hole;
a second insulating layer formed on the first insulating layer;
a first reflective electrode connected to the transmissive electrode and defining a first reflective region; and
a second reflective electrode separated from the transmissive electrode and the first reflective electrode and capacitively coupled to the drain electrode, the second reflective electrode defining a second reflective region,
wherein the storage electrode and the drain electrode are located both in the first reflective region and the second reflective region, and
wherein the second reflective electrode overlaps the drain electrode with the first and second insulating layers positioned therebetween, so as to form an auxiliary capacitor.

2. The TFT array panel of claim 1, wherein the transmissive electrode comprises a portion overlapping the second reflective electrode.

3. The TFT array panel of claim 1, wherein the second insulating layer comprises an embossed surface.

4. A thin film transistor (TFT) array panel comprising:
a substrate;
a gate line formed on the substrate and having a gate electrode;
a storage electrode line formed on the substrate and having a storage electrode;
a gate insulating layer formed on the storage electrode line and the gate line;
a semiconductor formed on the gate insulating layer and overlapping the gate electrode;
a data line formed on the gate insulating layer, connected to a source electrode extending over the semiconductor, and extending substantially perpendicularly to the gate line;
a drain electrode formed on the semiconductor, the drain electrode being positioned across the semiconductor from the source electrode and overlapping the storage electrode;
a first insulating layer formed on the data line and the drain electrode and having a first contact hole extending through the first insulating layer to the drain electrode;
a transmissive electrode formed on the first insulating layer;
a second insulating layer formed on the first insulating layer;
a first reflective electrode connected to the transmissive electrode and connected to the drain electrode via the first contact hole, the first reflective electrode defining a first reflective region; and
a second reflective electrode separated from the transmissive electrode and the first reflective electrode and capacitively coupled to the drain electrode, the second reflective electrode defining the second reflection region,
wherein the storage electrode and the drain electrode are located both in the first reflective region and the second reflective region, and
wherein the second insulating layer comprises a second contact hole extending through the second insulating layer to the drain electrode, and the first reflective electrode is connected to the drain electrode through the first and second contact holes.

* * * * *